United States Patent [19]
Martin et al.

[11] Patent Number: 5,176,226
[45] Date of Patent: Jan. 5, 1993

[54] TAILGATE CLOSING MECHANISM FOR TAILGATE HOIST

[75] Inventors: John C. Martin; Paul Martin, both of Toronto, Canada

[73] Assignee: Diesel Equipment Limited, Toronto, Canada

[21] Appl. No.: 604,147

[22] Filed: Oct. 29, 1990

[51] Int. Cl.⁵ .............................................. B66B 9/20
[52] U.S. Cl. ................................. 187/9 R; 414/545; 296/61
[58] Field of Search ............... 187/9 R; 414/545, 540, 414/539; 296/57 R, 61, 55

[56] References Cited
U.S. PATENT DOCUMENTS 3,048,283  8/1962  Phillips ................. 414/545
4,007,844  2/1977  Perkins ................. 414/545

Primary Examiner—Robert P. Olszewski
Assistant Examiner—Kenneth Noland
Attorney, Agent, or Firm—Fetherstonhaugh & Co.

[57] ABSTRACT

A tailgate closure mechanism for a tailgate hoist serves to move the tailgate from the horizontal position in which it functions as a platform to the upright position in which it functions as a gate. The closure mechanism includes a closing slide which is slidably mounted on at least one of the tailgate support slides and a connecting link that connects the slide to the tailgate. A drive mechanism is provided to drive the closing side toward its raised position. The drive mechanism may be in the form of an hydraulic ram, a compression spring or a combination ram and spring.

7 Claims, 5 Drawing Sheets

TAILGATE CLOSING MECHANISM FOR TAILGATE HOIST

BACKGROUND OF INVENTION

This invention relates to a tailgate closure mechanism for a tailgate hoist.

Tailgate hoists are commonly provided at the back end of a truck or van and employ a tailgate which is pivotally mounted for movement between a horizontal position in which it functions as a platform of the hoist and an upright position in which it functions as a tailgate for the vehicle. The tailgates are usually constructed so as to be rugged; and as a result, they are relatively heavy. In addition, the tailgates are pivotally mounted adjacent one edge and considerable force is required in order to at least initiate the pivotal movement of the tailgate from the horizontal position to the upright position. This procedure is usually assisted by a torsion bar which is mounted on the axis about which the tailgate pivots with respect to its supporting slides. The torsion bar only serves to provide a power assist and it has the disadvantage that in order to be effective when the platform begins to pivot from the horizontal position toward the upright position, the torsion bar is preloaded to an extent that it will continue to have an effect on closing when the tailgate approaches its upright position with the result that it can cause the tailgate to slam to the upright position. This can represent a hazard to workers engaged in the loading operation because it can catch the workers unaware and can result in injury to the workers.

SUMMARY OF INVENTION

It is an object of the present invention to provide an improved tailgate closing mechanism in which the drive mechanism for driving the tailgate toward its raised position is mounted on the slide members which support the gate for vertical movement in the support posts which support the slide members.

It is a further object of the present invention to provide a tailgate closure mechanism in which the drive mechanism which is mounted on the tailgate support slide is in the form of an hydraulic cylinder.

It is yet another object of the present invention to provide a tailgate closure mechanism in which the drive mechanism which is mounted on the tailgate support slide is in the form of a compression spring.

It is a still further object of the present invention to provide a tailgate closure mechanism in which the drive mechanism which is mounted on the tailgate support slide is in the form of an hydraulic cylinder and compression spring arranged to operate in series.

According to one aspect of the present invention, there is provided in a tailgate load elevator system in which first and second longitudinally elongated tailgate support slides are slidably mounted in first and second upright support posts respectively for movement between a lowered position and a raised position, each tailgate support slide having an upper end and a lower end, and pivot means pivotally mounting a tailgate on the lower ends of the tailgate support slides for movement between a closed position in which the tailgate is generally upright and functions as a tailgate and a generally horizontal position tailgate functions as a platform, the improvement of; a tailgate closing mechanism comprising; a tailgate closing slide slidably mounted on at least one of said tailgate support slides for sliding movement in the direction of the longitudinal extent of the tailgate support slides for movement toward and away from the pivot means between a lowered position proximate and a raised position remote from the pivot means, connecting means connecting the tailgate to the tailgate closure slide such that sliding movement of the tailgate closure slide causes pivotal movement of the tailgate to at least partially raise the tailgate toward the upright position in response to movement of said tailgate closure slide from said lowered position toward said raised position, drive means carried by said tailgate support slide and being operable to drive the tailgate closure slide toward its raised position to at least partially raise the tailgate as aforesaid in response to movement of said tailgate closure slide from said lowered position toward said raised position.

BRIEF DESCRIPTION OF THE DRAWINGS

The invention will be more clearly understood after reference to the following detailed specification read in conjunction with the drawings wherein;

With reference to FIG. 1 of the drawings, the reference numeral 10 refers generally to a power operated hoist 10 which also functions as a tailgate at the rear of a truck body 12. The power operated hoist 10 includes a stationary frame generally identified by the reference numeral 14 which includes a pair of vertically oriented guide posts 16.

The movable component of the hoist includes a tailgate platform 20 which is pivotally mounted at its inner end on longitudinally elongated slide members 22.

Figure 2:
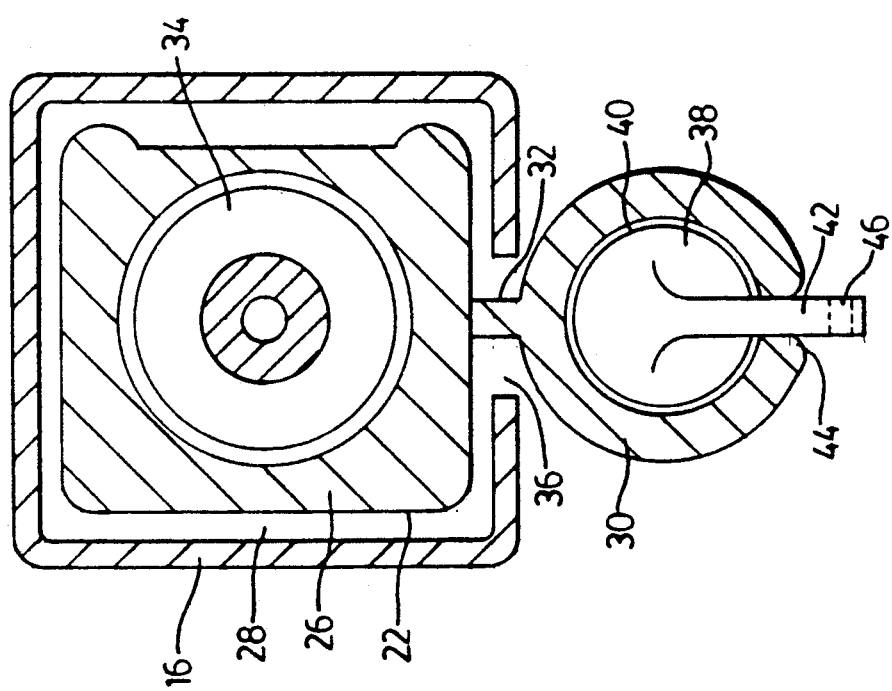
FIG. 2 is a sectional view taken along the line 2—2 of FIG. 1.

As shown in FIG. 2 of the drawings, the slide members 22 each comprise a main body portion 26 which is slidably mounted in the passage 28 which is formed in the upright support post 16. The slide member 22 also includes a sleeve 30 which is mounted on flange 32 which is secured to the main body portion 26. The flange 32 extends through a slot 36 which is formed in the front wall of the support posts 16.

As described in the applicant's co-pending application, entitled IMPROVEMENTS IN TAILGATE LOADERS, the main drive mechanism which drives the slide member 26 longitudinally within the posts 16 includes an hydraulic ram 34 which is located within the main body 26 of the slide member. The mechanism which raises and lowers the slide member 22 may, however, be constructed in accordance with U.S. Pat. No. 4,540,329 and will not therefore be described in detail.

As shown in FIG. 2, a tailgate closing slide member 38 is slidably mounted in the bore 40 of the sleeve 30 and has a flange 42 which extends through a narrow slot 44 formed along the front end of the sleeve 30. The flange 42 has a passage 46 formed therein.

Figure 4:
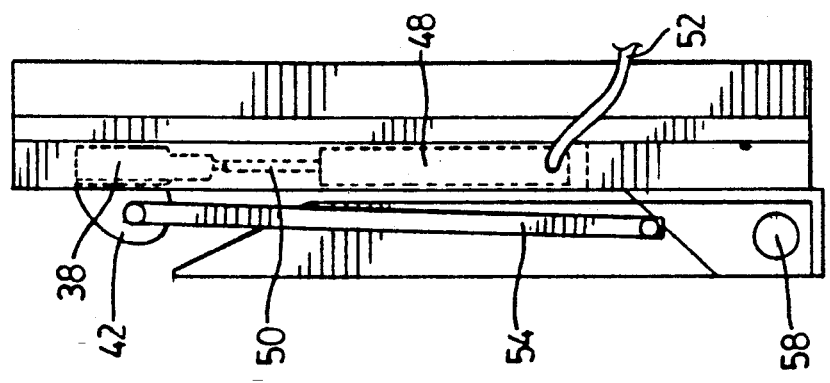
FIG. 4 is a side view similar to FIG. 3 showing the tailgate in the raised position.
Figure 3:
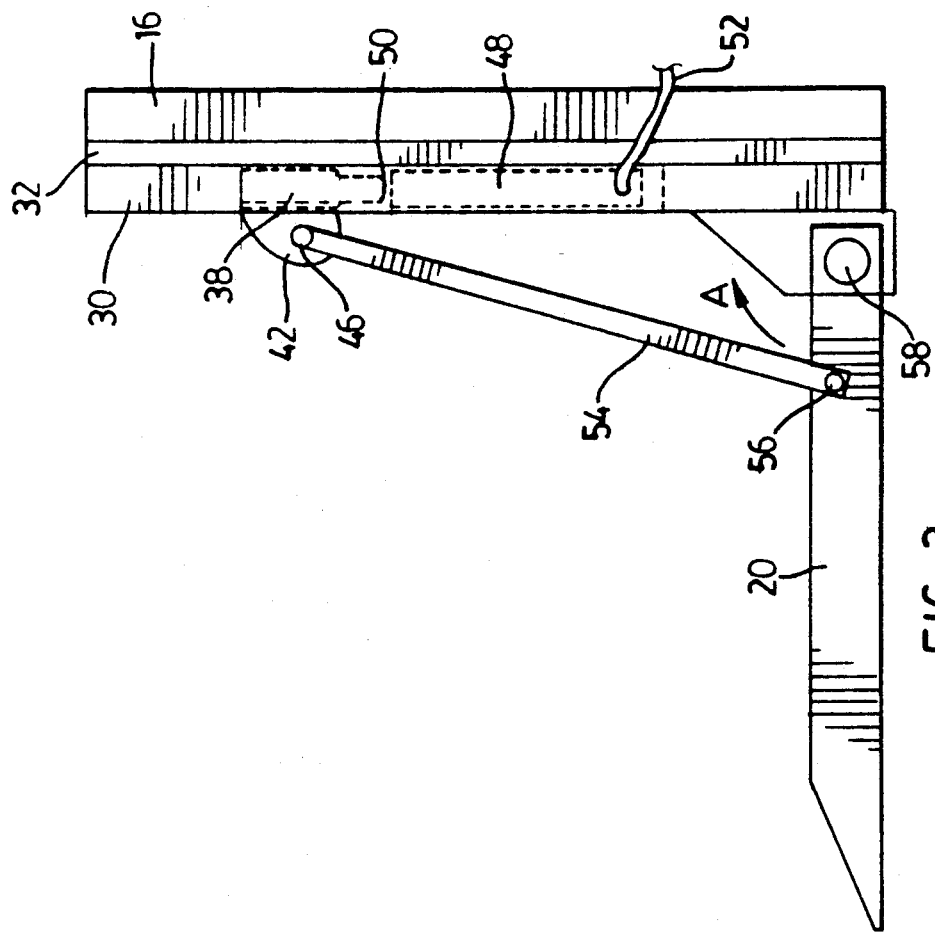
FIG. 3 is a side view of the tailgate elevator system of FIG. 1 showing the tailgate in the lowered position.

In the embodiment illustrated in FIGS. 3 and 4 of the drawings to which reference is now made, the tailgate closing slide member 38 is powered by an hydraulic ram 48 which is mounted in the bore 40 (FIG. 2). The ram 48 has a shaft 50 which can be extended from the retracted position shown in FIG. 3 to the extended position shown in FIG. 4 by supplying hydraulic fluid to the ram 48 through an hydraulic fluid supply line 52 from an hydraulic pump carried by the truck or van.

A link arm 54 has its upper end pivotally connected to the flange 42 by means of a pivot pin that extends through the passage 46 and its lower end pivotally mounted on a pivot pin 56 which is secured to a side edge of the tailgate 22 in close proximity to the pivotal axis 58 about which the tailgate 20 pivots from the lowered position shown in FIG. 3 to the upright position shown in FIG. 4.

In use, when the tailgate is located in the lowered position shown in FIG. 3 of the drawings and hydraulic fluid is supplied to the ram 48, the shaft 50 will extend from the cylinder portion of the ram and will displace the tailgate closure slide 38 upwardly toward the position shown in FIG. 4. As a result, the link 54 will be pulled upwardly and this upward movement of the link 54 will cause the tailgate 20 to pivot in the direction of the arrow A about the axis 58 until it is located in the raised position shown in FIG. 4. Suitable latching mechanisms may be provided for securing the tailgate in the upright position. Manually operable latching mechanisms are well known and will not therefore be described in detail. To lower the platform, it is merely necessary to release the latching mechanisms and to relieve the hydraulic pressure in the ram 58 and then manually pull the platform downwardly to the horizontal position. Suitable flow restricters can be located in the hydraulic fluid vent line to ensure that the tailgate can only move slowly as it pivots from the upright position to the horizontal position.

Figure 1:
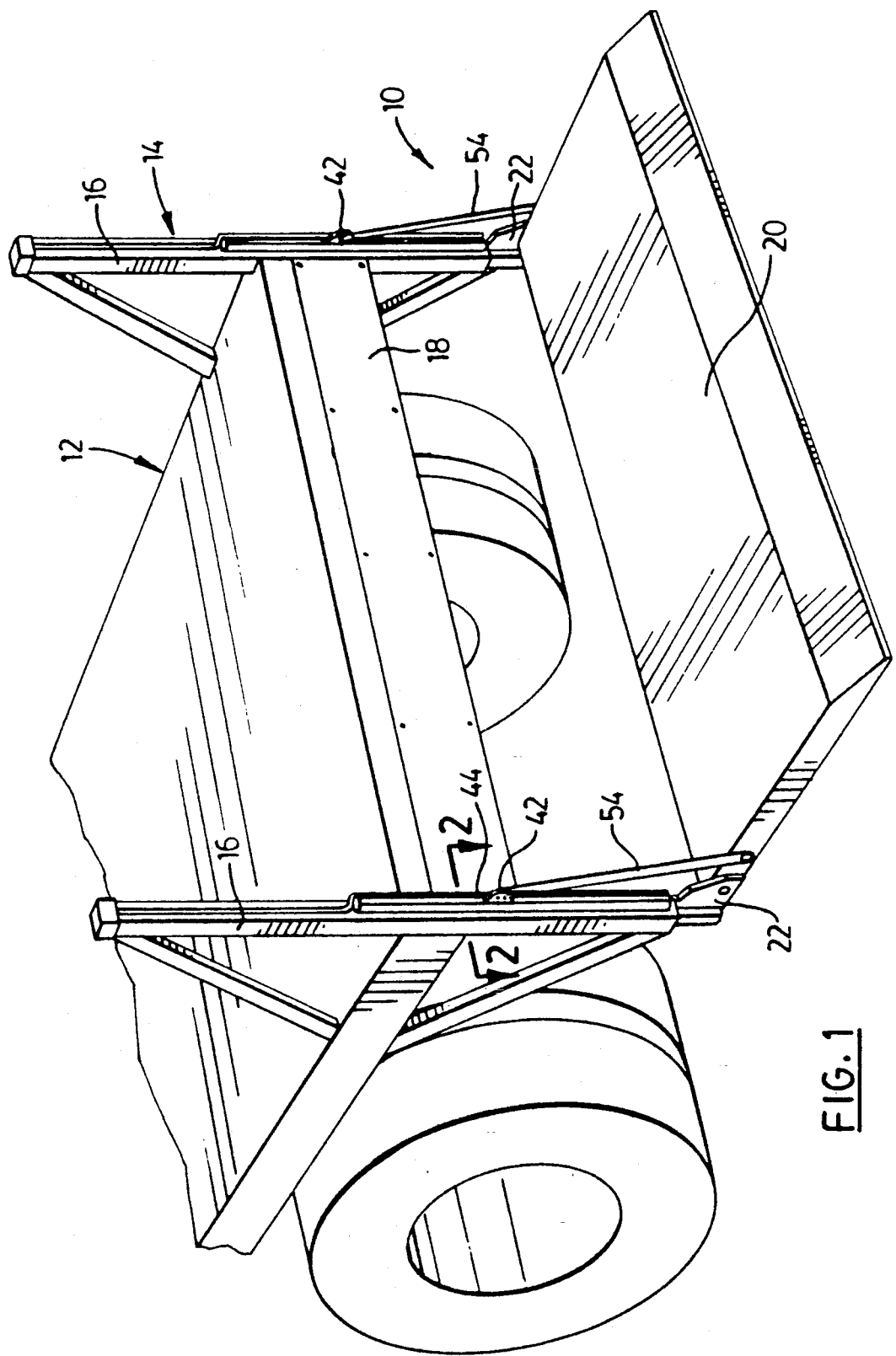
FIG. 1 is a pictorial view of a tailgate elevator system constructed in accordance with an embodiment of the present invention located at the back end of a truck.

While FIG. 1 of the drawings illustrates a tailgate load elevator assembly in which two tailgate closure mechanisms are provided, it will be apparent that only one such mechanism is essential in order to permit the tailgate to be power drive from the horizontal position to the upright position.

Figure 6:
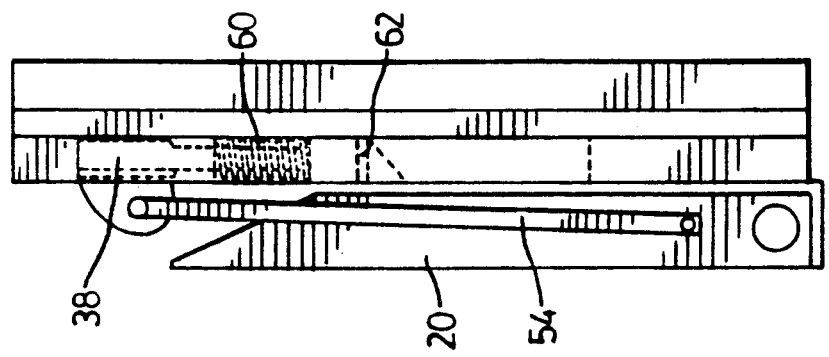
FIG. 6 is a side view similar to FIG. 5 showing the tailgate in the upright position.
Figure 5:
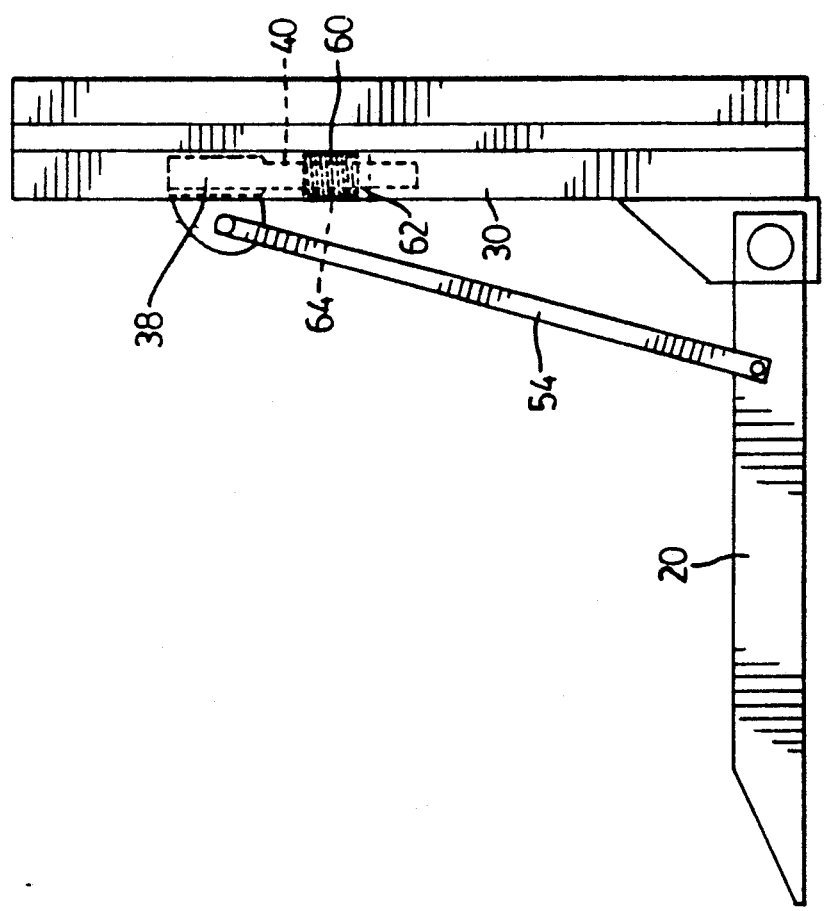
FIG. 5 is a side view of a tailgate similar to the tailgate of FIG. 3 in which an alternative drive mechanism is provided.

A further embodiment of the present invention is illustrated in FIG. 5 of the drawings wherein the extensible hydraulic ram 48 is replaced by a compression spring 60. The compression spring 60 is supported on the platform 62 which is mounted within the bore 40 of the sleeves 30. The tailgate closing slide member 38 has a shaft portion 64 which projects downwardly therefrom into the bore of the compression spring 60. When the tailgate platform 20 is located in the horizontal position shown in FIG. 5, the compression spring 64 will be compressed. In order to move the tailgate platform 20 to the upright position, it is merely necessary to raise the outer edge of the platform and the compression spring 60 will provide a power assist by urging the tailgate closure slide 38 toward its raised position shown in FIG. 6. Thus, it will be seen that the compression spring 60 will serve to provide a power assist which will facilitate the movement of the platform from a horizontal position to the upright position.

Figure 7:
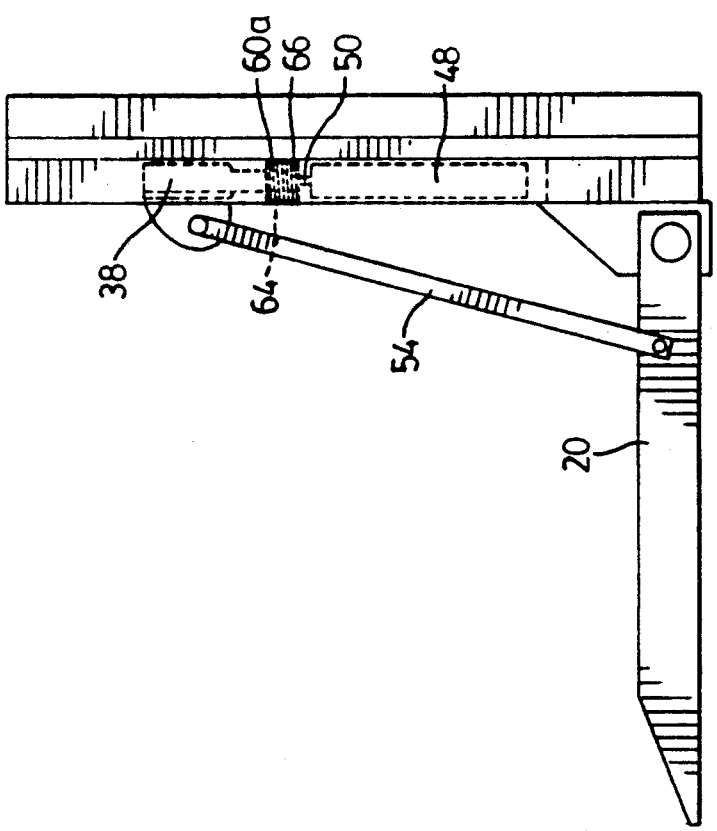
FIG. 7 is a side view of a tailgate assembly in which the drive mechanism includes the hydraulic cylinder and compression spring in combination.
Figure 8:
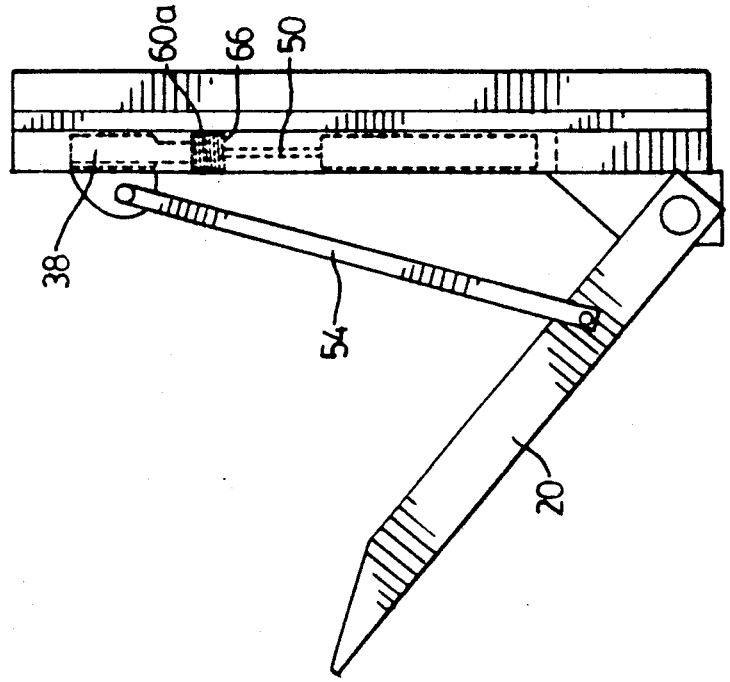
FIG. 8 is a side view similar to FIG. 7 showing the tailgate in a partially raised position.
Figure 9:
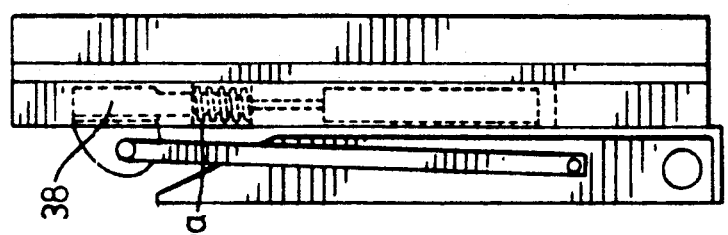
FIG. 9 is a side view similar to FIG. 8 showing the tailgate in the upright position.

A further embodiment of the present invention is illustrated in FIGS. 7, 8, and 9 of the drawings wherein a compression spring 60a and an hydraulic ram 48 are provided in combination. In this embodiment, the compression spring 60a is preferably of a lighter weight than the compression spring 60a used in the embodiment illustrated in FIGS. 5 and 6. The shaft 50 of the extensible ram 48 of the embodiment illustrated in FIG. 7 has an end plate 66 at the outer end thereof. The lower end of the compression spring 60a bears against the end plate 66. When the platform 20 is in the horizontal position shown in FIG. 7 the shaft 64 which projects downwardly from the tailgate closing slide member 38 bears against the end plate 66 and the compression spring 60a is compressed between the slide member 38 and the end plate 66.

To move the platform 20 from the horizontal position shown in FIG. 7, hydraulic fluid is supplied to the ram 48 and as a result the shaft 50 will move towards its extended position which is shown in FIG. 8. When the shaft 50 arrives at its fully extended position shown in FIG. 8, the spring 60a will then continue to extend to further displace the slide member 38 to raise the platform from the partially closed position shown in FIG. 8 to the fully upright position shown in FIG. 9. It will be noted that the hydraulic ram is used in order to power the movement of the platform from the horizontal position to the obliquely inclined position. It is during this initial displacement of the tailgate platform that the forces required in order to move the platform are at their greatest. After the platform has been raised to the position shown in FIG. 8 considerably less force is required in order to complete the closing operation and for this reason, the relatively light-weight spring 60 can achieve this objective without difficulty.

From the foregoing, it will be apparent that the present invention provides a simple and inexpensive powered tailgate closing mechanism.

We claim:

1. In a tailgate load elevator system in which first and second longitudinally elongated tailgate support slides are slidably mounted in first and second upright support posts respectively for movement between a lowered position and a raised position, each tailgate support slide having an upper end and a lower end, and pivot means pivotally mounting a tailgate on the lower ends of the tailgate support slides for movement between a closed position in which the tailgate is generally upright and functions as a tailgate and a generally horizontal position tailgate functions as a platform, the improvement of;

a tailgate closing mechanism comprising;

a tailgate closing slide slidably mounted on at least one of said tailgate support slides for sliding movement in the direction of the longitudinal extent of the tailgate support slides for movement toward and away from the pivot means between a lowered position proximate and a raised position remote from the pivot means, connecting means connecting the tailgate to the tailgate closure slide such that sliding movement of the tailgate closure slide causes pivotal movement of the tailgate to at least partially raise the tailgate toward the upright position in response to movement of said tailgate closure slide from said lowered position toward said raised position, drive means carried by said tailgate support slide and being operable to drive the tailgate closure slide toward its raised position to at least partially raise the tailgate as aforesaid in response to movement of said tailgate closure slide from said lowered position toward said raised position.

2. A tailgate elevator system as claimed in claim 1 wherein said drive means comprises a compression spring which is arranged between the tailgate closing slide and one of the tailgate support slides so as to be compressed by the movement of the tailgate closing slide toward its lowered position and which extends to move the tailgate slide toward its raised position to provide a power assist that urges the tailgate toward its upright position in use.

3. A tailgate elevator system as claimed in claim 1 wherein said drive means comprises;
an extensible ram which has one end connected to the tailgate closure slide and one end connected to one of the tailgate support slides, said ram being extensible to move the tailgate closing slide to its raised position to at least partially displace the tailgate toward its upright position and retractable to permit the tailgate closing slide to move to its lowered position to allow the tailgate to assume its horizontal position.

4. A tailgate elevator system as claimed in claim 3 wherein a housing, for housing the drive mechanism, is mounted on at least one of the tailgate support slides and is located outwardly from the upright support post in which said one of the tailgate support slides is mounted, said housing having a slipway in which said tailgate closing slide is slidably mounted and wherein said extensible ram is mounted in said housing.

5. A tailgate elevator system as claimed in claim 1 wherein said drive means comprises, in combination;
an extensible ram and a compression spring that extend in series, between the tailgate closure slide and one of the tailgate support slides, so as to be sequentially extensible to cause the ram to extend to initiate the movement of tailgate closing slide to its raised position to at least partially displace the tailgate toward its upright position and then to cause the spring to extend to complete the rotation of the tailgate to the upright position, said ram being retractable and said spring being compressible to permit the tailgate closing slide to move to its lowered position to allow the tailgate to assume its horizontal position.

6. A tailgate elevator system as claimed is claim 5 wherein a housing, for housing the drive mechanism, is mounted on at least one of the tailgate support slides and is located outwardly from the upright support post in which said one of the tailgate support slides is mounted, said housing having a slipway in which said tailgate closing slide is slidably mounted and wherein said extensible ram and said spring are mounted in said housing.

7. A tailgate elevator system as claimed in claim 1 wherein a housing, for housing the drive mechanism, is mounted on at least one of the tailgate support slides and is located outwardly from the upright support post in which said one of the tailgate support slides is mounted, said housing having a slipway in which said tailgate closing slide is slidably mounted.

* * * * *